United States Patent [19]

Sato et al.

[11] Patent Number: 4,539,255
[45] Date of Patent: Sep. 3, 1985

[54] MOISTURE-PERMEABLE WATERPROOF FABRIC

[75] Inventors: Keishi Sato, Suita; Takeshi Nishida, Ibaragi; Toji Kamiya, Takatsuki; Yutaka Tanaka, Osaka, all of Japan

[73] Assignee: Kanebo Ltd., Tokyo, Japan

[21] Appl. No.: 532,954

[22] Filed: Sep. 16, 1983

[30] Foreign Application Priority Data

Sep. 17, 1982 [JP] Japan ................... 57-162995

[51] Int. Cl.$^3$ ............. B32B 5/18; B32B 5/32; B32B 7/02; B32B 27/40
[52] U.S. Cl. ................... 428/252; 428/253; 428/286; 428/287; 428/315.5; 428/315.7; 428/315.9; 428/317.5; 428/317.7; 428/336; 428/423.3; 428/423.5; 428/423.7; 428/425.1
[58] Field of Search ............ 428/315.5, 336, 315.7, 428/315.9, 317.5, 317.7, 252, 253, 423.3, 423.5, 423.7, 425.1, 286, 287

[56] References Cited

U.S. PATENT DOCUMENTS 3,663,266  5/1972  Dye ................... 428/315.5

FOREIGN PATENT DOCUMENTS 30117  9/1971  Japan .
27681  7/1977  Japan .

Primary Examiner—James C. Cannon
Attorney, Agent, or Firm—Fisher, Christen & Sabol

[57] ABSTRACT

The moisture-permeable waterproof fabric according to the invention comprises a polyamino acid modified polyurethane film having a thickness of 2 to 20 microns and a fabric bonded on the polyurethane film by a polyurethane adhesive in an amount of at least 10 g/m$^2$. The polyamino acid modification ratio of the polyurethane film is within the range of 2 to 20%. The total amount of the adhesive and the polyurethane film is not more than 50 g/m$^2$.

7 Claims, No Drawings

MOISTURE-PERMEABLE WATERPROOF FABRIC

BACKGROUND OF THE INVENTION

This invention relates to a moisture-permeable waterproof fabric which has sufficient water resistance and excellent moisture-permeability as well as good feeling.

Various experiments have been done to produce a moisture-permeable waterproof fabric. However, they are based on a technical idea that a resin film having micro-pores is formed on a fabric to prevent permeation of water droplets. As a typical method, it has been well known to coat a polyurethane film prepared by wet process or to bond a polytetrafluoroethylene porous film on a surface of fabric. However, with the use of a porous film, deformation of film causes breaking film or increasing size of pores so that the water resistance becomes too poor to practically use. Accordingly, non-elastic dense fabric can be only used and products excellent in feeling can be hardly obtained. Practically, any product suitable to wears applied with vigorous movement, which requires moisture-permeable waterproof fabric, has not been obtained.

As a result of wearing tests, it has been known that required moisture-permeability is not less than 800 g/m$^2$·24 hr., preferably not less than 1200 g/m$^2$·24 hr. Such moisture-permeability can not be obtained with a general polyurethane film. Although polyamino acid and polyurethane-modified polyamino acid are used a moisture-permeable finishing material in a synthetic leather manufacture, they are poor in flexibility, elasticity and swelling property and can not be applied to waterproof fabrics.

An object of the invention is to dissolve the above disadvantages in the prior art and to provide a moisture-permeable waterproof fabric excellent in feeling and suitable to wears which may be applied with vigorous movement.

SUMMARY OF THE INVENTION

The moisture-permeable waterproof fabric according to the invention comprises a polyamino acid modified polyurethane film having a thickness of 2 to 20 microns and a fabric bonded on the polyurethane film by a polyurethane adhesive in an amount of at least 10 g/m$^2$. The polyamido acid modification ratio of the polyurethane film is within the range of 2 to 20%. The total amount of the adhesive and the polyurethane film is not more than 50 g/m$^2$.

The polyurethane adhesive may be a polyamide acid modified polyurethane. The polyamino acid modification ratio is preferably within the range of 2 to 20%.

DETAILED DESCRIPTION OF THE INVENTION

The modified polyurethane film may be made from one or plural polyurethanes. However, it is necessary that the polyurethane or polyurethanes are modified with polyamino acid in an average modification ratio of 2 to 20%. Lower polyamino acid modification ratio results in insufficient moisture-permeability and higher polyamino acid modification ratio makes it impossible to get an elastic film and a product excellent in feeling.

Waterproof fabrics used for usual wears are required a momentary elongation recovery of 80% or more, preferably 85% or more.

The polyamino acid modification ratio of the modified polyurethane film is preferably 3 to 12%. A good result is also obtained with a modified polyurethane film made from a mixture of at least one polyurethane which is modified with polyamino acid in a modification ratio of 5 to 50% and at least one polyurethane which is modified with polyamino acid in a modification ratio of 0 to 5%.

The modification ratio described in the specification means the weight percentage of polyamino acid in polymer. Polyamino acid modified polyurethanes may be easily produced by additionally polymerizing N-carboxyamino acid anhydride with polyurethanes.

The thickness of modified polyurethane film may be 2 to 20 microns. 3 to 10 microns are preferred. Too thin film causes problem in film strength and too thick film shows disadvantages in moisture-permeability and feeling.

As the adhesives, there may be general polyurethane adhesives. However, polyamino acid modified polyurethanes are preferably used. Particularly, those with a modification ratio of 2 to 20% are affective.

As polyurethanes used for the modified polyurethane film and the adhesive, there may be included general polyurethanes produced by a known method. However, polyether polyurethanes are preferred, because they are superior in moisture-permeability and antimildew property (resistance to hydrolysis by mold).

As described above, a polyurethane film used in the invention is a specific modified polyurethane film which has proper moisture-permeability and elasticity in itself. Accordingly, it can be applied in the state of non-porous film, and a waterproof fabric with a sufficient water resistance can be obtained with a very thin film. Further, even if an elastic knitted fabric is used as the base fabric, a product excellent in water resistance and moisture-permeability can be obtained without sacrificing feeling.

The method for producing waterproof fabrics according to the invention is not particularly limited. However, it is preferred that a modified polyurethane film is previously formed on releasing paper, the film is bonded on a fabric with an adhesive, and then the releasing paper is removed.

Preferably, the adhesive only adheres on a surface of the fabric so that the fabric is maintained to be porous. Further, an excellent moisture-permeability is obtained in the case of that fibers of the fabric in the part bonded with the modified polyurethane film are crimpy yarn consisting of a thermoplastic polymer.

The modified polyurethane film according to the invention may be colored by an incorporation of pigments, and fabrics may be bonded on both surfaces of a modified polyurethane film. Further, the waterproof fabric according to the invention may be applied with after-treatment such as water-repellent treatment after bonding film.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

Properties of the waterproof fabrics produced in the examples were examined by the following methods.

Water Resistance:

JIS L-1092
Moisture-Permeability:
JIS K-6328
Elongation Recovery:
JIS L-1079
Elongation ... 20%
Grip distance ... 20 cm
Measuring direction ... transverse direction
Feeling:
Functional tests by 10 persons skilled in handling textile fabrics.
⊚ Excellent (very soft or superior in nerve)
O Good (soft or nervous)
Δ Fairly good (slightly paperlike and a little hard)
X Bad (paperlike and hard)

EXAMPLE 1

(1) Preparation of polyurethanes

A mixture of 51 parts of adipic acid and 40 parts of propylene glycol was heated to about 185° C. in a nitrogen flow, and maintained at the same temperature for 6 hours with distilling away water. Then an excess amount of propylene glycol was distilled away under reduced pressure to obtain a viscous liquid. 18 parts of hexamethylene diisocyanate was added to 115 parts of the viscous liquid and the resultant mixture was heated at 150° C. for 3 hours with stirring in a nitrogen flow and then cooled to 40° C.

Thus obtained urethane prepolymer was added to an anisol solution of ethylenediamine and the mixture was heated at 50° C. for 2 hours in excess of amine. Then an excess amount of ethylenediamine was distilled away together with anisol under reduced pressure to obtain a polyurethane a-1 having a molecular weight of 85,000.

In the same manner as described above, two polyurethanes, a-2 having a molecular weight of about 67,000 and a-3 having a molecular weight of about 55,000, were prepared (2) Preparation of polyamino acid modified polyurethanes α-Methyl glutaminate-N-carboxylic acid anhydride (MG-NCA) was suspended in dichloroethane in various concentrations.

A mixture of an above-mentioned polyurethane, triethylamine (1/100 mol to 1 mol of MG-NCA) and chloroethane was added to the suspension with stirring, and polymerized at room temperature to produce polyamino acid modified polyurethanes as follows:

| Modified Polyurethane No. | Polyurethane | Amino Acid Modification Ratio (%) |
|---|---|---|
| A-1 | a-1 | 1.1 |
| A-2 | a-1 | 2.0 |
| A-3 | a-1 | 3.2 |
| A-4 | a-1 | 5.1 |
| A-5 | a-1 | 10.3 |
| A-6 | a-2 | 11.9 |
| A-7 | a-2 | 19.8 |
| A-8 | a-3 | 25.5 |
| A-9 | a-3 | 49.5 |
| A-10 | a-3 | 55.3 |

(3) Preparation of waterproof fabrics

Polyamino acid modified polyurethanes A-1 to A-8 were diluted with DMF and the viscosities were adjusted to 3000 to 6000 cps. The diluted polyurethanes were coated on releasing paper with a knife coater and dried at 120° C. to produce films have a thickness as shown in Table 1. Then, 100 parts of two-liquid type polyurethane (Crisbon 4070 manufactured by Dai-Nippon Ink and Chemicals Incorporated) was mixed with 15 parts of a cross-linking agent (Crisbon NX manufactured by Dai-Nippon Ink and Chemicals Incorporated), and the mixture was coated on the above-mentioned film with a knife coater, and then dried at 100° C. to obtain an adhesive layer of 15 g/m$^2$.

On the other hand, 6-nylon filament of 30d/9f was knitted with a 40-gauge warp knitting machine to get a half tricot fabric. The fabric was scoured, heat-set, then put on the above-mentioned adhesive layer and pressed with a pressure roll. It was maintained for 2 days in a room at 50° C. to produce several waterproof fabrics.

Water resistance, moisture-permeability, elongation recovery and feeling of the waterproof fabrics were examined. The obtained results are shown in Table 1.

The waterproof fabrics No. 2 to No. 7 according to the present invention had sufficient water resistances which corresponds to water resistance of 2000 mm or more, and were excellent in moisture-permeability, elongation recovery and feeling.

TABLE 1

| Waterproof Fabric No. | Film Modified Polyurethane No. | Film Modification Ratio (%) | Film Thickness (μ) | Amount of Adhesive (g/m$^2$) | Total Amount of Film and Adhesive (g/m$^2$) | Water Resistance (mm) | Moisture Permeability (g/m$^2$, 24 hr) | Elongation Recovery (%) | Feeling |
|---|---|---|---|---|---|---|---|---|---|
| 1* | A-1 | 1.1 | 2 | 15 | 17 | 2000< | 650 | 82 | ⊚ |
| 2 | A-2 | 2.0 | 2 | 15 | 17 | 2000< | 810 | 81 | ⊚ |
| 3 | A-3 | 3.2 | 3 | 15 | 18 | 2000< | 850 | 85 | ⊚ |
| 4 | A-4 | 5.1 | 5 | 15 | 20 | 2000< | 890 | 86 | ⊚ |
| 5 | A-5 | 10.3 | 7 | 15 | 22 | 2000< | 940 | 87 | ⊚ |
| 6 | A-6 | 11.9 | 7 | 15 | 22 | 2000< | 1110 | 84 | O |
| 7 | A-7 | 19.8 | 7 | 15 | 22 | 2000< | 1160 | 80 | O |
| 8* | A-8 | 25.5 | 7 | 15 | 22 | 2000< | 1200 | 77 | O |

*Controls

EXAMPLE 2

(1) Preparation of polyurethanes 4,4'-diphenylmethane diisocyanate was reacted with polyethylene adipate in the presence of ethylene diamine as a chain extender to produce two polyurethanes, b-1 having a molecular weight of about 80,000 and b-2 having a molecular weight of about 65,000.

(2) Preparation of polyamino acid modified polyurethanes

γ-propyl esters glutaminate-N-carboxylic acid anhydride (PG-NCA) was suspended in dichloroethane in various concentrations. A mixture of an above-mentioned polyurethane, triethylamine and chloroethane was added to the suspension, and polymerized at room temperature to produce polyamino acid modified polyurethanes as follows:

| Modified Polyurethane No. | Polyurethane | Amino Acid Modification Ratio (%) |
|---|---|---|
| B-1 | b-1 | 1.5 |
| B-2 | b-1 | 2.1 |
| B-3 | b-1 | 5.6 |
| B-4 | b-1 | 10.0 |
| B-5 | b-2 | 11.8 |
| B-6 | b-2 | 20.0 |

(3) Preparation of waterproof fabrics

Waterproof fabrics were obtained in the same manner as in Example (1) with the use of the above-mentioned modified polyurethanes.

Properties of the waterproof fabrics are shown in Table 2. Each of the waterproof fabrics No. 10, 11, 13 to 16 according to the present invention is superior in moisture-permeability, elongation recovery and feeling. On the other hand, the waterproof fabric No. 12 had a good moisture-permeability, but the adhesive strength between tricot and film was poor and peeling easily occurred by one laundering.

EXAMPLE 3

Polyurethanes and amino acid modified polyurethanes prepared in Example (1) were mixed to obtain polyamino acid modified polyurethanes as shown in Table 3.

TABLE 3

| Polyurethane Composition No. | Polyurethane | Mixing Ratio (parts) | Modification Ratio in the Composition (%) |
|---|---|---|---|
| A-11 | a-1/A-4 | 25/10 | 1.5 |
| A-12 | a-1/A-7 | 80/10 | 2.2 |
| A-13 | a-1/A-7 | 50/10 | 3.3 |
| A-14 | A-3/A-9 | 60/10 | 9.8 |
| A-15 | A-3/A-9 | 45/10 | 11.6 |
| A-16 | A-1/A-8 | 25/75 | 19.4 |
| A-17 | A-4/A-9 | 80/10 | 10.3 |
| A-18 | a-3/A-9 | 50/50 | 24.8 |

Waterproof fabrics were prepared in the same manner as in Example (1) with the use of the polyurethane compositions shown in Table 3 instead of modified polyurethanes A-1 to A-8.

Properties of the waterproof fabrics are shown in Table 4.

TABLE 4

| Waterproof Fabric No. | Film Modified Polyurethane No. | Film Modification Ratio (%) | Film Thickness (μ) | Amount of Adhesive (g/m²) | Total Amount of Film and Adhesive (g/m²) | Water Resistance (mm) | Moisture Permeability (g/m², 24 hr) | Elongation Recovery (%) | Feeling |
|---|---|---|---|---|---|---|---|---|---|
| 18* | A-11 | 1.5 | 2 | 15 | 17 | 2000< | 700 | 83 | ◉ |
| 19 | A-12 | 2.2 | 2 | 15 | 17 | 2000< | 860 | 83 | ◉ |
| 20 | A-13 | 3.3 | 3 | 15 | 18 | 2000< | 910 | 86 | ◉ |
| 21 | A-14 | 9.8 | 7 | 15 | 20 | 2000< | 1010 | 88 | ◉ |
| 22 | A-15 | 11.6 | 7 | 15 | 22 | 2000< | 1170 | 86 | ○ |
| 23 | A-16 | 19.4 | 7 | 15 | 22 | 2000< | 1200 | 82 | ○ |
| 24* | A-17 | 10.3 | —** | — | — | — | — | — | — |
| 25* | A-18 | 24.8 | 7 | 15 | 22 | 2000< | 1210 | 75 | Δ |

*Controls
**The modified polyurethane composition was partially gelled during film-forming process and a water-proof film was not produced.

EXAMPLE (4)

The same adhesive as in Example (1) was coated on releasing paper with a knife coater, dried at 100° C. Then the same tricot fabric as in Example (1) was put on the adhesive layer and pressed with a pressure roll. After removing the releasing paper to transfer the adhesive layer on the tricot fabric, each of the waterproof fabrics No. 13 and No. 14 was put on the adhesive layer

TABLE 2

| Waterproof Fabric No. | Film Modified Polyurethane No. | Film Modification Ratio (%) | Film Thickness (μ) | Amount of Adhesive (g/m²) | Total Amount of Film and Adhesive (g/m²) | Water Resistance (mm) | Moisture Permeability (g/m², 24 hr) | Elongation Recovery (%) | Feeling |
|---|---|---|---|---|---|---|---|---|---|
| 9* | B-1 | 1.5 | 2 | 15 | 17 | 2000< | 690 | 83 | ◉ |
| 10 | B-2 | 2.1 | 2 | 15 | 17 | 2000< | 820 | 82 | ◉ |
| 11 | B-3 | 5.6 | 5 | 15 | 20 | 2000< | 900 | 85 | ◉ |
| 12* | B-4 | 10.0 | 10 | 7 | 17 | 2000< | 1090 | 88 | ◉ |
| 13 | B-4 | 10.0 | 10 | 10 | 20 | 2000< | 1000 | 89 | ◉ |
| 14 | B-4 | 10.0 | 10 | 20 | 30 | 2000< | 910 | 87 | ○ |
| 15 | B-5 | 11.8 | 15 | 20 | 35 | 2000< | 840 | 86 | ○ |
| 16 | B-6 | 20.0 | 20 | 20 | 40 | 2000< | 800 | 80 | Δ |
| 17* | B-6 | 20.0 | 25 | 15 | 40 | 2000< | 710 | 81 | X |

*Controls of the above-mentioned tricot fabric in the manner as the modified polyurethane film of the waterproof fabric was faced on the adhesive layer. The piled fabrics were pressed on a pressure roll, and then maintained for 2 days in a room at 50° C. to obtain waterproof fabrics of double faced tricot.

Properties of the waterproof fabrics are shown in Table 5. The waterproof fabrics of double faced tricot according to the invention were excellent in moisture-permeability and feeling.

TABLE 6

| Waterproof Fabric No. | Film Modified Polyurethane No. | Film Modification Ratio (%) | Film Thickness (μ) | Adhesive Polyurethane | Adhesive Modification (%) | Adhesive Amount (g/m²) | Total Amount of Film and Adhesive (g/m²) | Water Resistance (mm) | Moisture Permeability (g/m² 24 Hr) | Elongation Recovery (%) | Feeling |
|---|---|---|---|---|---|---|---|---|---|---|---|
| 30 | A-13 | 3.3 | 3 | A-4 | 4.3 | 15 | 17 | 2000< | 1220 | 85 | ◎ |
| 31 | A-14 | 9.8 | 7 | A-2 | 1.7 | 15 | 22 | 2000< | 1010 | 88 | ◎ |
| 32 | A-14 | 9.8 | 7 | 1:1 mixture of A-2 and A-3 | 2.2 | 15 | 22 | 2000< | 1180 | 86 | ◎ |
| 33 | A-14 | 9.8 | 7 | A-4 | 4.3 | 15 | 22 | 2000< | 1410 | 86 | ◎ |
| 34 | A-14 | 9.8 | 7 | A-6 | 10.0 | 15 | 22 | 2000< | 1620 | 85 | ○ |
| 35 | A-14 | 9.8 | 7 | 1:2 mixture of A-7 and A-8 | 19.8 | 15 | 22 | 2000< | 1680 | 83 | ○ |
| 36 | A-14 | 9.8 | 7 | A-8 | 21.5 | 15 | 22 | 2000< | 1730 | 77 | Δ |
| 37 | A-16 | 19.8 | 7 | A-4 | 4.3 | 15 | 22 | 2000< | 1570 | 80 | ○ |

TABLE 5

| Waterproof Fabric No. | One Side Bonded Waterproof Fabric No. | Amount of Newly used Adhesive (g/m²) | Total Amount of Film and Adhesive (g/m²) | Water Resistance (mm) | Moisture-Permeability (g/m² 24 hr) | Elongation Recovery (%) | Feeling |
|---|---|---|---|---|---|---|---|
| 26 | 13 | 10 | 30 | 1000 | 880 | 87 | 0 |
| 27 | 14 | 10 | 40 | 1000 | 850 | 86 | 0 |
| 28 | 14 | 20 | 50 | 1000 | 800 | 86 | Δ |
| 29* | 14 | 25 | 55 | 1000 | 750 | 86 | x |

*Control

EXAMPLE (5)

(1) Preparation of two liquid type adhesives 500 parts of the polyamino acid modified polyurethane of Example (1) was dissolved in a mixed solvent of 750 parts of MEK and 750 parts of DMF. 5 parts of hexamethylene diisocyanate and 45 parts of polypropylene glycol (molecular weight of about 1000) were added to the solution, and heated at 70° C. for 3 hours with stirring. Then 75 parts of MEK and 75 parts of DMF were further added to the solution, and cooled. To 100 parts of thus prepared polyurethane solution, 72 parts of Duranate 24A-100 (polyisocyanate manufactured by Asahi Kasei Co., Ltd.) was added, and uniformly agitated to produce two liquid type adhesives having different polyamino acid modification ratio.

(2) Preparation of waterproof fabrics

Waterproof fabrics were prepared by the same method as in Example (1) with the use of the adhesive obtained by the above-mentioned (1). Properties of the waterproof fabrics are shown in Table 6. The waterproof fabrics according to the present invention had excellent moisture-permeability and elongation recovery. It was understood with the results that the moisture-permeability was remarkably improved by using polyamino acid modified polyurethane as an adhesive.

EXAMPLE (6)

(1) Preparation of polyurethane

A mixture of 200 parts of polypropylene glycol having a molecular weight of about 2000 and 16 parts of hexamethylene diisocyanate was heated at 150° C. for 4 hours with stirring in a nitrogen flow, and then cooled to obtain a polyurethane C.

(2) Preparation of polyamino acid modified polyurethanes

MG-NCA was dissolved in DMF in various concentrations. A mixture of polyurethane C, triethyl amine and DMF was added to the solution, and polymerized to produce polyamino acid modified polyurethanes as follows:

| Modified Polyurethane No. | Amino Acid Modification Ratio (%) |
|---|---|
| C-1 | 2.0 |
| C-2 | 3.3 |
| C-3 | 6.5 |
| C-4 | 11.3 |

(3) Preparation of waterproof fabrics

Waterproof fabrics were prepared in the same manner as in Example (1) with the use of films made from the above modified polyurethanes C-1 to C-4, the same adhesive as used for producing the waterproof fabric No. 33 in Example (5) and fabrics shown in Table 7.

Properties of the waterproof fabrics are shown in Table 8. All products were superior in water resistance, and moisture-permeability. However, particularly excellent moisture-permeability was obtained in the case of that crimpy yarn was adhesive with the adhesive layer.

TABLE 7

| Fabric No. | Texture | Yarn |
|---|---|---|
| F-0 | 36 gauge half tricot | front yarn and back yarn: 6-nylon filament yarn of 30d/9f |
| F-1 | 36 gauge half tricot | front yarn and back yarn: 6-nylon false twisted yarn of 30d/9f |
| F-2 | 210 regular taffeta | warp and woof: nylon filament yarn of 70d/36f |
| F-3 | Nylon stretch woven fabric | warp: spandex yarn of 40d/1f covered by nylon false twisted yarn woof: nylon coily yarn of 140d/36f |
| F-4 | reversible pile tricot | pile yarn (front): cotton yarn 40's back: polyester yarn of 30d/12f |
| F-5 | reversible pile tricot | pile yarn (front): cotton yarn 40's back: polyester yarn of 50d/24f | then polymerized to produce polyamino acid modified polyurethanes as follows:

| Modified Polyurethane No. | Polyamino Acid Modification Ratio (%) |
|---|---|
| D-01 | 23.0 |
| D-02 | 35.5 |

(3) Preparation of waterproof fabrics

Modified polyurethane D-1 or D-2 was mixed with polyurethane a-1 of Example (1) or polyurethane c of Example (4). The mixture was diluted with a mixed solvent of MEK and DMF (1:1), to adjust the viscosity of it to 3000–5000 cps. A film was made from the diluted polyurethane mixture and then laminated with nylon toricot by the same method as in Example (1) to produce various waterproof fabrics.

The mixing ratios of polyurethanes are shown in Table 9, and properties of the resultant waterproof fabrics are shown in Table 10.

TABLE 8

| Waterproof Fabric No. | Fabric No. | Film Modified Polyurethane No. | Film Modification Ratio (%) | Film Thickness ($\mu$) | Adhesive Modification Ratio (%) | Adhesive Amount (g/m$^2$) | Total Amount of Film and Adhesive (g/m$^2$) | Water Resistance (mm) | Moisture Permeability (g/m$^2$ 24 Hr) | Elongation Recovery (%) |
|---|---|---|---|---|---|---|---|---|---|---|
| 38 | F-0 | C-1 | 2.0 | 7 | 4.3 | 15 | 22 | 2000< | 1110 | 97 |
| 39 | F-1 | C-1 | 2.0 | 7 | 4.3 | 15 | 22 | 2000< | 1200 | 92 |
| 40 | F-0 | C-2 | 3.3 | 7 | 4.3 | 15 | 22 | 2000< | 1260 | 91 |
| 41 | F-1 | C-2 | 3.3 | 7 | 4.3 | 15 | 22 | 2000< | 1350 | 91 |
| 42 | F-0 | C-3 | 6.5 | 7 | 4.3 | 15 | 22 | 2000< | 1400 | 90 |
| 43 | F-1 | C-3 | 6.5 | 7 | 4.3 | 15 | 22 | 2000< | 1510 | 91 |
| 44 | F-0 | C-4 | 11.3 | 7 | 4.3 | 15 | 22 | 2000< | 1520 | 87 |
| 45 | F-1 | C-4 | 11.3 | 7 | 4.3 | 15 | 22 | 2000< | 1610 | 87 |
| 46 | F-2 | C-3 | 6.5 | 7 | 4.3 | 15 | 22 | 2000< | 1310 | — |
| 47 | F-3 | C-3 | 6.5 | 7 | 4.3 | 15 | 22 | 2000< | 1510 | 91 |
| 48 | F-4 | C-3 | 6.5 | 7 | 4.3 | 15 | 22 | 2000< | 1370 | 87 |
| 49 | F-5 | C-3 | 6.5 | 7 | 4.3 | 15 | 22 | 2000< | 1520 | 86 |

EXAMPLE 7

(1) Preparation of polyurethane

A mixture of 100 parts of polytetramethylene glycol having a molecular weight of about 2000, 100 parts of polyethylene glycol having a molecular weight of about 2000 and 15 parts of hexamethylene diisocyanate was stirred for 4 hours at 150° C. in a nitrogen flow, and then cooled to obtain polyurethane d.

(2) Preparation of polyamino acid modified polyurethanes

MG-NCA was dissolved or suspended in DMF in various concentrations. To the liquid, a mixture of polyurethane d, triethyl amine and DMF was added, and

TABLE 9

| Polyurethane Composition No. | Polyurethane | Mixing Ratio (parts) | Modification Ratio in the Composition (%) |
|---|---|---|---|
| D-1 | a-1/D-01 | 100/5 | 1.1 |
| D-2 | a-1/D-01 | 100/10 | 2.1 |
| D-3 | a-1/D-01 | 100/40 | 6.6 |
| D-4 | a-1/D-01 | 100/100 | 11.5 |
| D-5 | a-1/D-01 | 0/100 | 23.0 |
| D-6 | c/D-02 | 100/10 | 3.2 |
| D-7 | c/D-02 | 100/20 | 5.9 |
| D-8 | c/D-02 | 100/40 | 10.1 |

TABLE 10

| Waterproof Fabric No. | Film Polyurethane Composition No. | Film Modification Ratio (%) | Film Thickness ($\mu$) | Adhesive Type ** | Adhesive Modification Ratio (%) | Adhesive Amount (g/m$^2$) | Total Amount of Film and Adhesive (g/m$^2$) | Water Resistance (mm) | Moisture Permeability (g/m$^2$ 24 Hr) | Elongation Recovery (%) | Feeling |
|---|---|---|---|---|---|---|---|---|---|---|---|
| 50* | D-1 | 1.1 | 2 | 1 | 0 | 15 | 17 | 2000< | 660 | 81 | ◎ |
| 51 | D-2 | 2.1 | 2 | 1 | 0 | 15 | 17 | 2000< | 830 | 81 | ◎ |
| 52 | D-3 | 6.6 | 7 | 1 | 0 | 15 | 22 | 2000< | 910 | 85 | ◎ |
| 53 | D-4 | 11.5 | 7 | 1 | 0 | 15 | 22 | 2000< | 1170 | 86 | ◎ |
| 54* | D-5 | 23.0 | 7 | 1 | 0 | 15 | 22 | 2000< | 1400 | 69 | Δ |
| 55 | D-6 | 3.2 | 3 | 30 | 4.3 | 15 | 18 | 2000< | 1420 | 82 | ◎ |
| 56 | D-7 | 5.9 | 7 | 30 | 4.3 | 15 | 22 | 2000< | 1540 | 89 | ◎ |

TABLE 10-continued

| Waterproof Fabric No. | Film Polyurethane Composition No. | Film Modification Ratio (%) | Film Thickness (μ) | Adhesive Type ** | Adhesive Modification Ratio (%) | Adhesive Amount (g/m²) | Total Amount of Film and Adhesive (g/m²) | Water Resistance (mm) | Moisture Permeability (g/m² 24 Hr) | Elongation Recovery (%) | Feeling |
|---|---|---|---|---|---|---|---|---|---|---|---|
| 57 | D-8 | 10.1 | 7 | 30 | 4.3 | 15 | 22 | 2000< | 1680 | 85 | ◎ |

*Controls
**1 . . . Adhesive used for producing waterproof fabric No. 1
30 . . . Adhesive used for producing waterproof fabric No. 30

What we claim is:

1. A moisture-permeable waterproof fabric having a water resistance measured by JIS D-1092 of more than 2000 mm and a moisture-permeability measured by JIS K-6328 of at least 800 g/m²·24 hr, which comprises a polyamino acid modified polyurethane film having a thickness of 2 to 20 microns and a fabric bonded on said polyurethane film by a polyurethane adhesive in an amount of at least 10 g/m², the polyamino acid modification ratio of said polyurethane film being within the range of 2 to 20% and the total amount of said adhesive and said polyurethane film being not more than 50 g/m².

2. A moisture-permeable waterproof fabric as defined in claim 1, wherein said adhesive comprises a polyamino acid modified polyurethane in which the modification ratio is within the range of 2 to 20%.

3. A moisture-permeable waterproof fabric as defined in claim 1, wherein the polyamino acid modification ratio of said polyurethane film is within the range of 3 to 12%.

4. A moisture-permeable waterproof fabric as defined in claim 1, wherein said polyurethane film has a thickness of 3 to 10 microns.

5. A moisture-permeable waterproof fabric as defined in claim 1, wherein said polyurethane film is made from a mixture of at least one polyurethane modified with polyamino acid in a modification ratio of 5 to 50% and at least one polyurethane modified with polyamino acid in a modification ratio of 0 to 5%.

6. A moisture-permeable waterproof fabric as defined in claim 1, wherein fibers of said fabric in the part bonded with said polyurethane film are crimpy yarn consisting of a thermoplastic polymer.

7. A moisture-permeable waterproof fabric as defined in claim 1, wherein said adhesive only adheres on the surface of said fabric so that said fabric is maintained to be porous.

* * * * *